United States Patent [19]

Nishida et al.

[11] Patent Number: 4,669,429
[45] Date of Patent: Jun. 2, 1987

[54] FUEL INJECTION SYSTEM FOR DIESEL ENGINE

[75] Inventors: Takumi Nishida; Yosihtaka Nomoto; Masanori Sahara; Hirofumi Yamauchi, all of Hiroshima, Japan

[73] Assignee: Mazda Motor Corp., Japan

[21] Appl. No.: 715,380

[22] Filed: Mar. 25, 1985

[30] Foreign Application Priority Data

Mar. 29, 1984 [JP] Japan .................................. 59-61722

[51] Int. Cl.$^4$ .......................................... F02M 39/00
[52] U.S. Cl. .................. 123/179 L; 123/458; 123/447; 239/95
[58] Field of Search .............. 123/458, 494, 496, 446, 123/447, 179 L; 239/585, 88-95

[56] References Cited

U.S. PATENT DOCUMENTS

| 4,346,681 | 8/1982 | Schleicher | 123/179 L |
|---|---|---|---|
| 4,403,585 | 9/1983 | Ohie | 123/446 |
| 4,440,133 | 4/1984 | Jourde | 123/458 |
| 4,546,739 | 10/1985 | Nakajima | 123/299 |
| 4,595,352 | 10/1985 | Jourde | 123/447 |

FOREIGN PATENT DOCUMENTS

| 2551330 | 5/1977 | Fed. Rep. of Germany | 123/179 L |
|---|---|---|---|
| 3,105,671 | 9/1982 | Fed. Rep. of Germany | 123/179 L |
| 57-151058 | 9/1982 | Japan | 123/458 |
| 0023060 | 2/1984 | Japan | 123/446 |
| 554446 | 7/1943 | United Kingdom | 123/179 L |
| 1399757 | 7/1975 | United Kingdom | 123/179 L |

OTHER PUBLICATIONS

SEA Technical Paper Series No. 810479.

Primary Examiner—Carl Stuart Miller
Attorney, Agent, or Firm—Gerald J. Ferguson, Jr.; Michael P. Hoffman; Ronni S. Malamud

[57] ABSTRACT

A fuel injection system for a diesel engine is provided with a needle-lift-suppressing type fuel injection nozzle such as the central plunger type pintle fuel injection nozzle which has a valve needle adapted to be lifted under fuel pressure fed from a fuel injection pump to increase the effective spray area with increase in the lift of the valve needle and a needle-lift-suppressing means which limits the lift of the valve needle to a pre-lift of a predetermined amount at low load and/or low speed, and a starting detecting means for detecting starting of the engine, said needle-lift-suppressing means being arranged to permit lift of the valve needle beyond said pre-lift irrespective of the engine load and engine speed when the engine is started.

18 Claims, 11 Drawing Figures

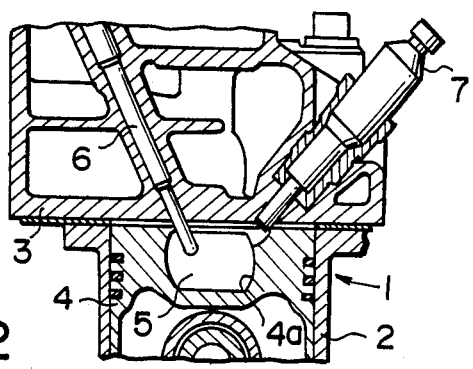
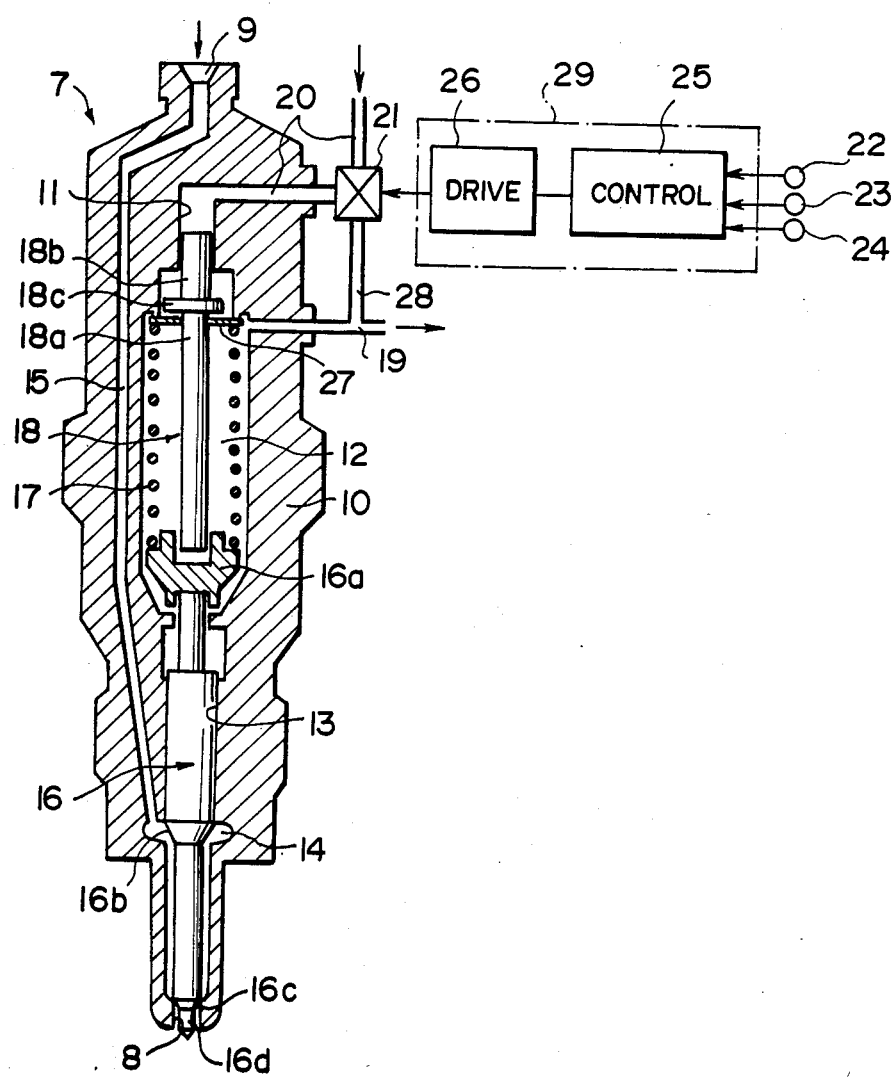

FUEL INJECTION SYSTEM FOR DIESEL ENGINE

BACKGROUND OF THE INVENTION

1. Field of the Invention

This invention relates to a fuel injection system for a diesel engine, and more particularly to a fuel injection system for a diesel engine having a pintle fuel injection nozzle which has a valve needle lifted by the fuel pressure and in which the effective area of the spray hole or the spray area is changed according to the lift of the valve needle. In this specification, the term "pintle fuel injection nozzle" should be broadly interpreted to include throttle type nozzles in which the so-called "throttle range" in which the valve needle throttles the spray hole extends over a relatively large part of the lift of the valve needle.

2. Description of the Prior Art

There have been proposed various fuel injection nozzles in which the lift of the valve needle is suppressed to throttle the spray hole during light load operation of the engine, thereby promoting atomization of sprayed fuel at light load. This type will be referred to as the "needle-lift-suppressing type", hereinbelow. As one kind of needle-lift-suppressing type fuel injection nozzles, there has been known a central plunger type pintle fuel injection nozzle as disclosed in Japanese Unexamined Patent Publication No. 57(1982)-151058. In the central plunger type pintle fuel injection nozzle disclosed in this Patent Publication, a plunger member is provided behind a valve needle to be slidable coaxially with the valve needle, and by imparting a predetermined pressure to the plunger member, lift of the valve needle is suppressed after a predetermined lift of the valve needle (pre-lift) so that the lift of the valve needle is maintained in the throttle range for a predetermined time interval, thereby promoting atomization of sprayed fuel and changing the fuel injection rate (the amount of fuel injected per unit crank angle). In the fuel injection nozzle of this type, the amount of the pre-lift is not completely fixed but is self-controlled according to the fuel pressure so that the amount of the lift of the valve needle is increased with increase in the fuel pressure as shown in FIG. 11. The self-control arrangement of the valve needle lift is advantageous in that fluctuation in the effective area of the spray hole from cylinder to cylinder due to deposition of carbon or variation in the machined dimensions of the spray holes, for instance, can be compensated for.

However, the conventional central plunger type pintle fuel injection nozzle has a drawback in that since the amount of the pre-lift solely depends upon the fuel pressure fed from the fuel injection pump, it can be matched to only a particular operating condition of the engine, and cannot properly use functions for atomization of fuel and/or for changing the fuel injection amount according to various operating conditions of the engine. Thus, in the conventional central plunger type pintle fuel injection nozzle, it is difficult to control the lift of the valve needle in order to obtain improved combustion in the combustion chamber, to improve the engine output power, and to obtain improved emission control according to the operating condition over a wide operating range of the engine.

For example, the amount of fuel injected from the fuel injection pump is generally increased upon cranking (starting-supercharging) as indicated at A in FIG. 9 in order to ensure good starting performance. In a fuel injection nozzle which is not of the needle-lift-suppressing type, the amount of fuel injected from the nozzle is actually increased corresponding to discharge characteristics of the fuel injection pump as shown by the solid line in FIG. 10, whereby the cranking time is shortened. On the other hand, in the conventional central plunger type pintle fuel injection nozzle or in other needle-lift-suppressing type fuel injection nozzles, the amount of fuel injected from the nozzle is not so increased as in a nozzle not of the needle-lift-suppressing type even when the amount of fuel injected from the fuel injection pump is increased according to the characteristics shown in FIG. 9, since the needle lift is suppressed at low load and low speed as upon cranking. (See the dotted line in FIG. 10.) Accordingly, the cranking time required before complete combustion starts is not sufficiently shortened. This is especially significant when the ambient temperature is low, and heavy load is exerted on the battery.

The following table shows a comparison in the starting abilities between the central plunger type pintle fuel injection nozzle (one of the needle-lift-suppressing type nozzles) and nozzle which is not of the needle-lift-suppressing type).

|  | time required to start firing | time required to start complete combustion |
| --- | --- | --- |
| central plunger type pintle nozzle | 1.5 to 1.8 sec | 30 to 35 sec |
| nozzle not of the needle-lift suppressing type | 2.0 sec | 24 sec |

The "time required to start firing" represents the time interval for which the engine has to be cranked before firing starts and the "time required to start complete combustion" represents the time interval for which the engine has to be cranked before complete combustion starts. As can be understood from the table, though the difference in the time required to start firing between the two types of nozzles is relatively small, the time required to start complete combustion is substantially longer with the central plunger type than with the nozzle not of the needle-lift-suppressing type.

As needle-lift-suppressing type fuel injection nozzles other than the central plunger type pintle fuel injection nozzle, there have been known one in which the needle lift is limited at low load and low speed by changing the position of the stopper, one in which the needle lift is limited at low load and low speed by imparting to the valve needle a hydraulic pressure other than the fuel pressure from the fuel injection pump, and the like. As will be apparent to those skilled in the art, the aforesaid problem arises also in needle-lift-suppressing type fuel injection nozzles other than the central plunger type pintle fuel injection nozzle.

SUMMARY OF THE INVENTION

In view of the foregoing observations and description, the primary object of the present invention is to provide an improved fuel injection system for a diesel engine in which atomization of sprayed fuel can be promoted at light load and at the same time good starting performance of the engine can be ensured.

The fuel injection system in accordance with the present invention is provided with a needle-lift-suppressing type fuel injection nozzle such as the central plunger type pintle fuel injection nozzle which has a valve needle adapted to be lifted under fuel pressure fed from a fuel injection pump to increase the effective spray area with increase in the lift of the valve needle and a needle-lift-suppressing means which limits the lift of the valve needle to a pre-lift of a predetermined amount at low load and/or low speed, and a starting detecting means for detecting starting of the engine, said needle-lift-suppressing means being arranged to permit lift of the valve needle beyond said pre-lift irrespective of the engine load and engine speed when the engine is started.

In accordance with the present invention, the fuel injection rate is reduced and at the same time atomization of sprayed fuel is promoted at low load and/or low speed by limiting the needle lift to the pre-lift, whereby the engine output power and emission control are improved at low load and/or low speed, and further the cranking time can be shortened since the valve needle is permitted to be lifted beyond the pre-lift to increase the fuel injection rate when the engine is cranked to start.

BRIEF DESCRIPTION OF THE DRAWINGS

FIG. 1 is a fragmentary cross-sectional view of a combustion chamber portion of a direct injection type diesel engine employing a fuel injection system in accordance with a first embodiment of the present invention, FIG. 2 is an enlarged cross-sectional view of a nozzle employed in the fuel injection system of the first embodiment.

DESCRIPTION OF THE PREFERRED EMBODIMENT

Figure 3:
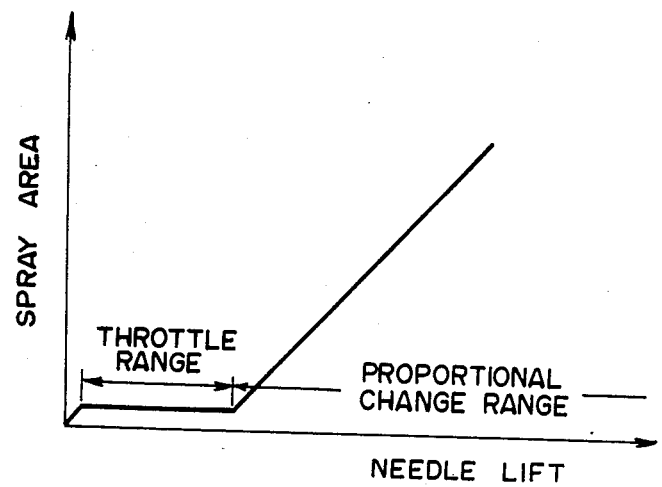
FIG. 3 is a view showing the relation between the valve needle lift and the spray area in the fuel injection system of the first embodiment.

In FIG. 1 which shows a combustion chamber portion of a direct injection type diesel engine having a fuel injection system in accordance with a first embodiment of the present invention, reference numeral 2 denotes a cylinder formed in a cylinder block 1. A cylinder head 3 is mounted on the top of the cylinder block 1 and a piston 4 is fit into the cylinder 2 for reciprocation. The piston 4 is provided at the top surface thereof with a cavity 4a for forming a combustion chamber 5.

Though not shown, an intake port and an exhaust port are formed in the cylinder head 3 to be communicated with the combustion chamber 5. The intake port is shaped and positioned so that an air swirl is produced in the combustion chamber 5 during the intake stroke.

A glow pin plug 6 for assisting cold starting and a pintle fuel injection nozzle 7 are mounted in the cylinder head 3. The fuel injection nozzle 7 is directed to spray fuel in the direction of the air swirl produced in the combustion chamber 5.

As shown in FIG. 2, the pintle fuel injection nozzle 7 comprises a nozzle body 10 in which a cylinder 11, a spring chamber 12, a valve needle retaining hole 13, a fuel pressure chamber 14, and a fuel spray hole 8 are coaxially formed in this order from the rear end (the upper end in FIG. 2) to the front end to communicate with each other. The fuel spray hole 8 opens in the combustion chamber 5. The nozzle body 10 is further provided with a fuel passage 15 by way of which the fuel pressure chamber 14 (fuel spray hole 8) is communicated with a fuel inlet 9 which is formed to open in the rear end of the nozzle body 10 and is connected to a fuel injection pump (not shown). In the hollow portion from the spring chamber 12 to the fuel spray hole 8 is inserted a valve needle 16 slidably retained by the valve needle retaining hole 13 in the liquid tight fashion. The valve needle 16 comprises a spring retaining portion 16a disposed in the spring chamber 12, a pressure portion 16b which receives the fuel pressure in the fuel pressure chamber 14, a valve portion 16c for opening and closing the spray hole 8 and a throttle portion 16d inserted into the spray hole 8 spaced from the wall surface thereof by a predetermined distance. In the spring chamber 12 is disposed a nozzle spring 17 for urging the valve needle 16 in the valve closure direction. When pressurized fuel from the fuel injection pump is introduced into the fuel pressure chamber 14 through the fuel inlet 9 and the fuel passage 15, the valve needle 16 is opened or lifted overcoming the force of the spring 17 by the pressure imparted to the pressure portion 16b thereof and thereby the pressurized fuel is sprayed into the combustion chamber 5 through the spray hole 8. As the lift of the valve needle 16 increases, the opening area of the spray hole 8 or the effective spray area changes as shown in FIG. 3. That is, at smaller lifts of the valve needle 16 before the throttle portion 16d leaves the spray hole 8, the effective spray area is held substantially constant (referred to as "throttle range") and after the throttle portion 16d is moved away from the spray hole 8, the effective spray area is increased in proportion to the lift of the valve needle 16 (referred to as "proportional change range"), and thereafter the lift of the valve needle 16 reaches maximum.

In FIG. 2, a reference numeral 19 denotes a drain passage through which leakage fuel leaking into the spring chamber 12 from the fuel pressure chamber 14 through the fine space between the valve needle 16 and the wall surface defining the valve needle retaining hole 13 is discharged to fuel reservoir (not shown).

Said cylinder 11 behind the spring chamber 12 is connected, by way of a pressure passage 20, to a pressure source (not shown) the pressure medium of which is fuel and which is disposed outside the nozzle body 10. A plunger member 18 is received in the hollow portion from the cylinder 11 to the spring chamber 12 for limited sliding movement coaxially with the valve needle 16. The plunger member 18 comprises a rod portion 18a disposed in the spring chamber 12, a plunger portion 18b slidably fit into the cylinder 11 and a flange portion 18c between the rod portion 18a and the plunger portion 18b. The plunger member 18 is slidable between an uppermost position in which the flange portion 18c abuts against the upper (rear) end wall portion of the spring chamber 12 and a lowermost position in which the flange portion 18c abuts against a stopper member 27 disposed at an intermediate portion of the spring chamber 12. In the lowermost position of the plunger member 18 the lower end of the plunger member 18 (rod portion 18a) is opposed to the spring retaining portion 16a forming the upper end of the valve needle 16 spaced from the spring retaining portion 16a by a predetermined distance. After the valve needle 16 is lifted to a position in which the spring retaining portion 16a abuts against the rod portion 18a of the plunger member 18, lift of the valve needle 16 is suppressed by a predetermined pressure imparted to the upper end of the plunger portion 18b of the plunger member 18.

Said pressure passage 20 and the drain passage 19 are connected with each other outside the nozzle body 10 by way of a communicating passage 28. A pressure control valve 21 in the form of a duty valve for reducing the pressure in the pressure passage 20 is provided at the junction between the pressure passage 20 and the communicating passage 28.

The pressure control valve 21 is controlled by a control device 29 according to the operating condition of the engine. The control device 29 comprises a control circuit 25 which receives outputs of an engine rpm sensor 22 for detecting the engine speed, an engine load sensor 23 for detecting load on the engine and an ambient temperature sensor 24 for detecting ambient temperature, and controls a solenoid driving circuit 26 for driving the duty solenoid of the pressure control valve 21.

Figure 4:
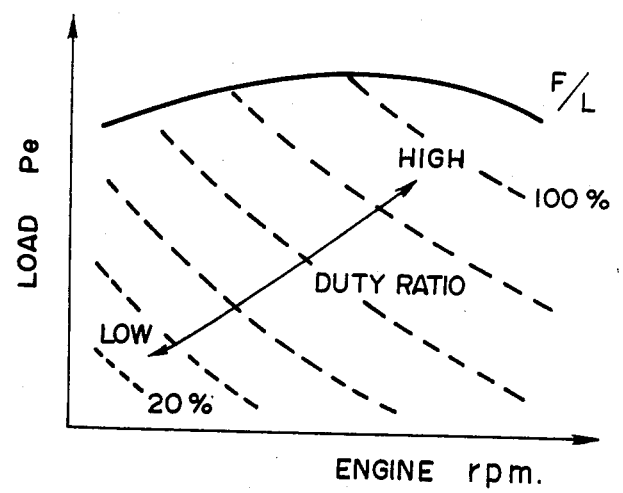
FIG. 4 is a view for illustrating the relation between the operating condition of the engine and the duty ratio signal to be delivered to the pressure control valve.

As shown in FIG. 4, the control device 29 delivers a low duty ratio signal to the pressure control valve 21 to increase the fuel pressure to be imparted to the plunger member 18 when the engine operates at low load and low speed, and delivers a high duty signal to the pressure control valve 21 to reduce the fuel pressure to be imparted to the plunger member 18 when the engine operates at heavy load near the full load F/L and at high speed. Thus the control device 29 reduces the fuel pressure to be imparted to the plunger member 18 as at least one of the engine load and the engine speed increases.

Figure 5:
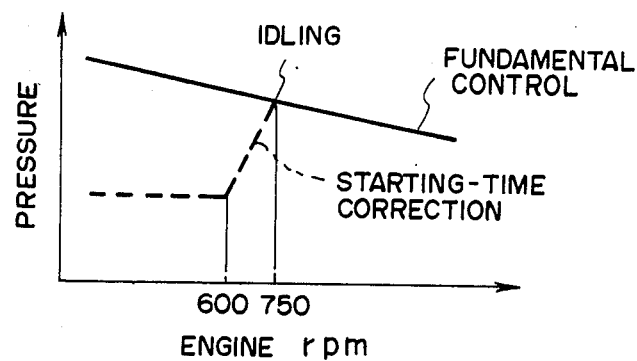
FIG. 5 is a view for illustrating the control to be made on the pressure to be imparted to the plunger member in the first embodiment.

Further, the control device 29 makes a starting-time correction upon starting of the engine as shown in FIG. 5. That is, normally, the pressure to be imparted to the plunger member 18 is controlled with respect to the engine speed according to the fundamental control characteristics shown by the solid line in FIG. 5 which are set based on the relation shown in FIG. 4. On the other hand, when the engine is cranked (In this particular embodiment, it is determined that the engine is cranked when the engine rpm is lower than a preset rpm, e.g., 600 rpm, the preset rpm being set lower than the idling speed, e.g., 750 rpm.), the pressure in the cylinder 11 is leaked by substantially communicating the pressure passage 20 with the drain passage 19 so that the pressure to be imparted to the plunger member 18 is substantially reduced to interrupt suppression of the needle lift by the plunger member 18, thereby increasing the fuel injection rate. As the engine speed increases from 600 rpm to 750 rpm, the pressure to be imparted to the plunger member 18 is gradually increased to reduce the fuel injection rate.

To the pressure passage 20, the fuel pressure discharged from the fuel injection pump may be fed by branching fuel to be fed to the fuel inlet 9, or pressure from a pressure source separated from the fuel injection pump may be fed. In the former case, it is preferred that a check valve be provided between the pressure passage 20 and the fuel inlet 9 in order to prevent the pressure in the pressure passage 20 from acting on the fuel inlet 9.

When pressurized fuel is supplied to the fuel injection nozzle 7, the pressurized fuel is introduced into the fuel pressure chamber 14 through the fuel inlet 9 via the fuel passage 15, and pushes the pressure portion 16b of the valve needle 16 to lift the valve needle 16 against the force of the nozzle spring 17, whereby the fuel is sprayed into the combustion chamber 5 through the spray hole 8. After the spring retaining portion 16a of the valve needle 16 abuts against the rod portion 18a of the plunger member 18, the valve needle 16 is lifted together with the plunger member 18.

The fuel pressure introduced into the cylinder 11 from the pressure source through the pressure passage 20 acts on the upper end of the plunger portion 18b of the plunger member 18 to push down the plunger member 18 toward the valve needle 16. Thus, lift of the valve needle 16 after the spring retaining portion 16a of the valve needle 16 abuts against the plunger member 18 is controlled by controlling the pressure imparted to the plunger member 18.

Figure 6:
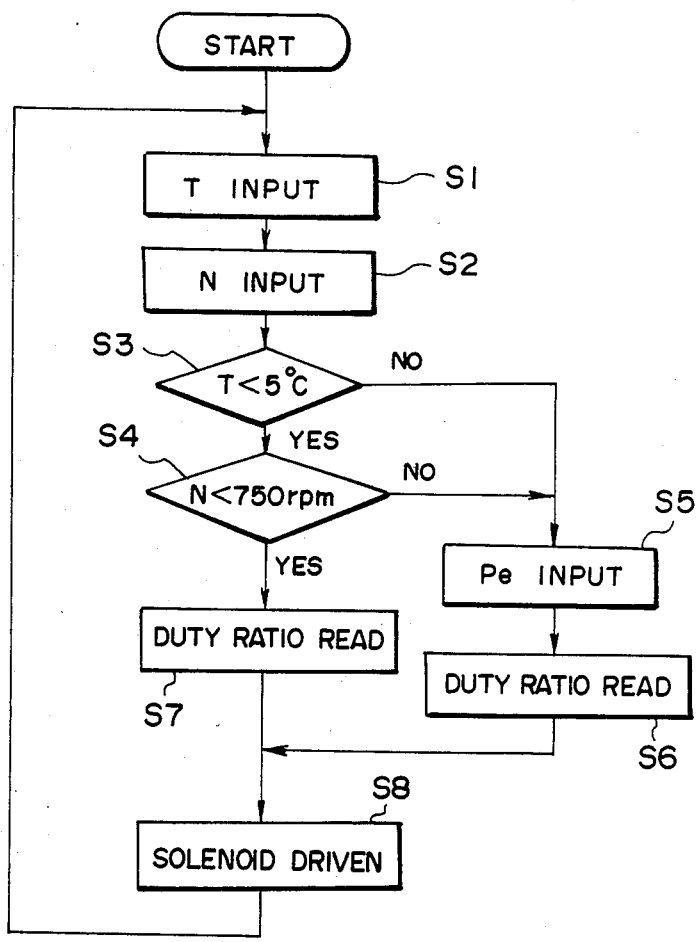
FIG. 6 is a flow chart for illustrating the operation of the control circuit of the fuel injection system of the first embodiment.

The control to be made on the valve needle 16 will be described with reference to the flow chart shown in FIG. 6, hereinbelow. In step S1, an ambient temperature signal T is input from the ambient temperature sensor 24 and in step S2, an engine speed signal N is input from the engine rpm sensor 22. Then it is determined whether or not the ambient temperature T is lower than 5° C. in step S3. When it is determined that the ambient temperature T is lower than 5° C., the control device 29 proceeds to step S4 where it is determined whether or not the engine speed N is lower than the idling speed (750 rpm). When it is determined that the ambient temperature T is not lower than 5° C. in the step S3 or when it is determined that the engine speed N is not lower than the idling speed, that is, when it is not determined that the engine is being cranked at a low temperature, the control device 29 proceeds to step S5. In the step S5, an engine load signal Pe from the engine load sensor 23 is input, and then in the next step S6, a duty ratio according to the engine speed signal and the engine load signal is read from a duty ratio map stored in advance based on the fundamental control characteristics shown in FIG. 5. In step S8, the duty solenoid of the pressure control valve 21 is driven according to the duty ratio, whereby the fuel pressure to be imparted to the plunger member 18 is controlled.

On the other hand, when it is determined that the ambient temperature T is lower that 5° C. in the step S3 and at the same time it is determined that the engine speed N is lower than the idling speed in the step S4, that is, when it is determined that the engine is being cranked at a low temperature, a duty ratio for starting is read from a duty ratio map stored in advance based on the starting time correction characteristics shown in FIG. 5. Then the duty solenoid of the pressure control valve 21 is driven according to the duty ratio for starting in the step S8. After the step S8, the control device 29 returns to the step S1 and repeats the steps described above.

Thus, when the operating condition of the engine is in the low-load low-speed region and the engine is not being cranked at low temperature, a low duty signal is delivered from the control device 29 to the pressure control valve 21 and the fuel pressure imparted to the plunger member 18 is increased, thereby increasing the force resisting lift of the valve needle 16. This effect is obtained while the lift of the valve needle 16 is in the throttle range in which the throttle portion 16d of the valve needle 16 throttles the spray hole, and by thus suppressing lift of the valve needle 16 when the lift of the valve needle 16 is in the throttle range, the condition in which fuel is injected from the spray hole 8 at high velocity is maintained for a long time, thereby promoting atomization of the fuel to improve combustion and to contribute to reduction of HC emission. On the other hand, when the operating condition of the engine is in the high-load high-speed region, a high duty ratio signal is delivered from the control device 29 to the pressure control valve 21 and the fuel pressure imparted to the plunger member 18 is reduced, thereby weakening the force resisting lift of the valve needle 16. Accordingly, the valve needle 16 is smoothly lifted without experiencing suppression of the lift to the proportional change range or to the full lift position in which the throttle portion 16d of the valve needle 16 is retracted away from the spray hole 8, whereby sufficient amount of fuel is fed to the engine to increase the engine output power.

When the engine is cranked at low temperature, a duty ratio signal having a value higher than the duty ratio signal according to the fundamental control characteristics is delivered from the control device 29 to the pressure control valve 21, and the fuel pressure imparted to the plunger member 18 is reduced by a large amount, whereby the fuel injection amount is increased to shorten the cranking time. When the engine starts to make complete combustion and the engine speed is increased to the idling speed, the fuel pressure imparted to the plunger member 18 is increased and the control on the fuel pressure is changed to the fundamental control.

Figure 7:
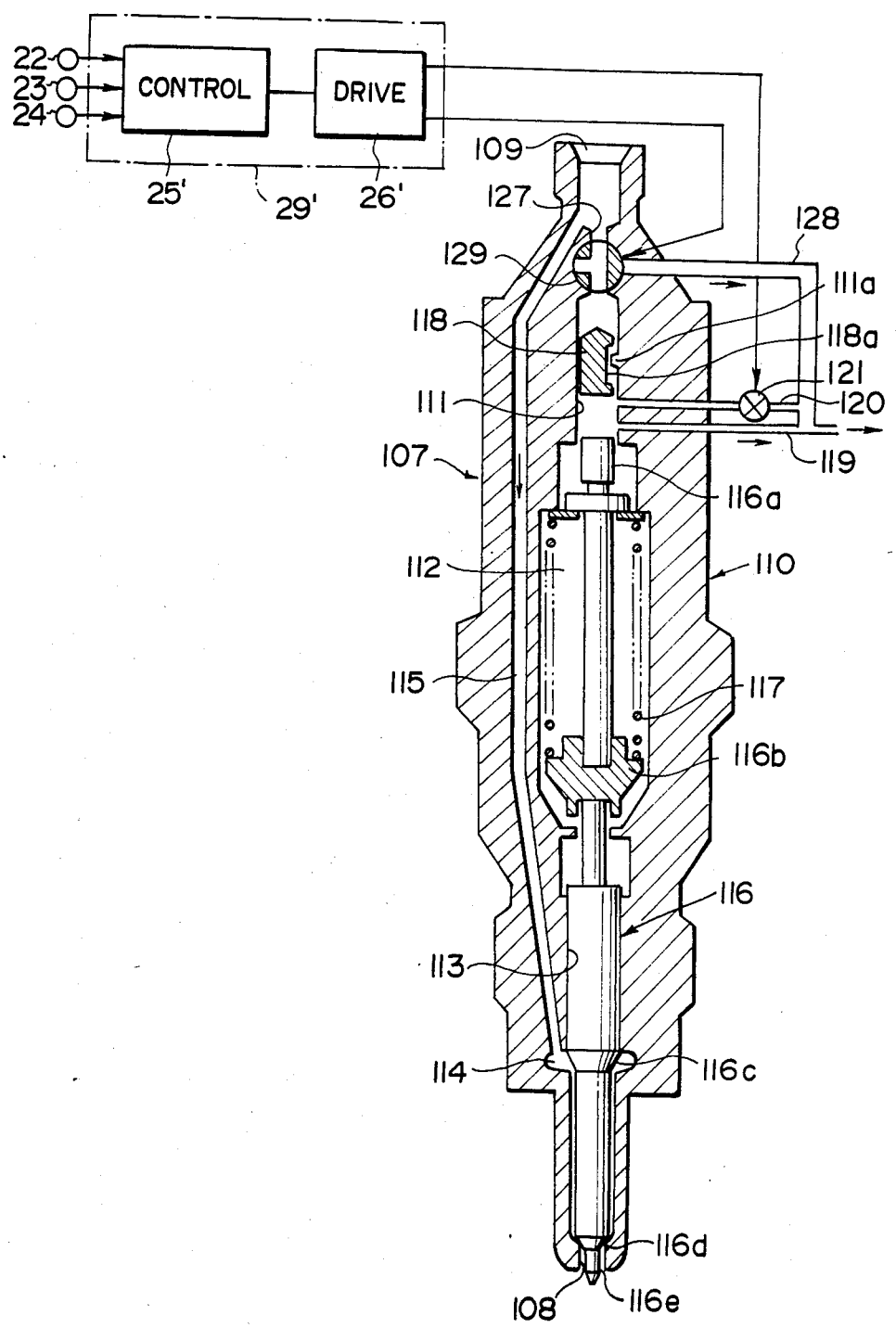
FIG. 7 is an enlarged cross-sectional view of a pintle nozzle employed in the fuel injection system in accordance with a second embodiment of the present invention.

FIG. 7 shows a pintle fuel injection nozzle employed in a second embodiment of the present invention.

As shown in FIG. 7, the pintle fuel injection nozzle 107 comprises a nozzle body 110 in which a fuel inlet 109, a pressure passage 127, a cylinder 111, a spring chamber 112, a valve needle retaining hole 113, a fuel pressure chamber 114, and a fuel spray hole 108 are coaxially formed in this order from the rear end (the upper end in FIG. 7) to the front end to communicate with each other. The fuel spray hole 108 opens in the combustion chamber and the fuel inlet 109 is connected to a fuel injection pump (not shown). The nozzle body 110 is further provided with a fuel passage 115 by way of which the fuel inlet 109 and the fuel pressure chamber 114 (fuel spray hole 108) directly communicate with each other. In the hollow portion from the cylinder 111 to the fuel spray hole 108 is inserted a valve needle 116 slidably retained by the valve needle retaining hole 113 in the liquid-tight fashion. The valve needle 116 comprises a piston portion 116a inserted into the front end portion of the cylinder 111, a spring retaining portion 116b disposed in the spring chamber 112, a pressure portion 116c which receives the fuel pressure in the fuel pressure chamber 114, a valve portion 116d for opening and closing the spray hole 108 and a throttle portion 116e inserted into the spray hole 108 spaced from the wall surface thereof by a predetermined distance. In the spring chamber 112 is disposed a nozzle spring 117 for urging the valve needle 116 in the valve closure direction. When pressurized fuel from the fuel injection pump is introduced into the fuel pressure chamber 114 through the fuel inlet 109 and the fuel passage 115, the valve needle 116 is opened or lifted overcoming the force of the spring 117 by the pressure imparted to the pressure portion 116c thereof and thereby the pressurized fuel is sprayed into the combustion chamber through the spray hole 108. As the lift of the valve needle 116 increases, the opening area of the spray hole 108 or the effective spray area changes in the same manner as in the nozzle 7 of the first embodiment. That is, at smaller lifts of the valve needle 116 before the throttle portion 116e leaves the spray hole 108, the effective spray area is held substantially constant (the throttle range) and after the throttle portion 116e is moved away from the spray hole 108, the effective spray area is increased in proportion to the lift of the valve needle 116 (the proportional change range), and thereafter the lift of the valve needle 116 reaches maximum.

A plunger member 118 is received in the rear portion of the cylinder 111 for limited sliding movement, with an engaging groove 118a formed in the peripheral surface thereof being engaged with a projection 111a formed on the wall surface defining the cylinder 111. That is, the plunger member 118 is slidably disposed behind the valve needle 116 coaxially therewith, the front end of the plunger member 118 being opposed to the piston portion 116a or the rear end portion of the valve needle 116 and the rear end surface of the plunger member 118 being adapted to receive the fuel pressure from the fuel inlet 109 through the pressure passage 127.

First and second drain passages 119 and 120 open in the cylinder 111 between the rear end of the valve needle 116 and the plunger member 118 at positions spaced from each other in the axial direction of the cylinder 111 by a predetermined distance. Through the drain passages 119 and 120, leakage fuel leaking into the cylinder 111 and the spring chamber 112 from the fuel pressure chamber 114 through the fine space between the valve needle 116 and the wall surface defining the valve needle retaining hole 113 is discharged to a fuel reservoir (not shown). The first drain passage 119 is positioned to be closed by the piston portion 116a of the valve needle 116 while the lift of the valve needle 116 is in the throttle range in which the spray area is narrowed by the throttle portion 116e of the valve needle 116. On the other hand, the second drain passage 120 is positioned to be closed by the piston portion 116a of the valve needle 116 when the lift of the valve needle 116 is in the proportional change range in which the effective spray area is increased in proportion to the lift of the valve needle 116.

The second drain passage 120 is provided with a solenoid valve 121 for selectively opening and closing the second drain passage 120. A communicating passage 128 connects an intermediate portion of the pressure passage 127 behind the plunger member 118 with the second drain passage 120 downstream of the solenoid valve 121. A solenoid rotary valve 129 is disposed at the junction between the pressure passage 127 and the communicating passage 128 to selectively open and close the pressure passage 127. When the rotary valve 129 is closed, the pressure passage 127 is closed and at the same time, the portion of the pressure passage 127 on the side of cylinder 111 with respect to the rotary valve 129 (This portion of the pressure passage 127 will be referred to as "cylinder side portion" hereinbelow while the portion of the pressure passage 127 on the other side of the rotary valve 129 will be referred to as "inlet side portion".) is communicated with the communicating passage 128. On the other hand, when the rotary valve 129 is opened, the pressure passage 127 is opened and the communication between the cylinder side portion of the pressure passage 127 and the communicating passage 128 is broken.

A control device 29' for controlling the valves 121 and 129 comprises a valve driving circuit 26' for driving the valves 121 and 129 and a control circuit 25' which receives outputs of an engine speed sensor 22, an engine load sensor 23 and ambient temperature sensor 24 and controls the valve driving circuit 25' according to the operating condition of the engine.

When pressurized fuel is supplied to the fuel injection nozzle 107, the pressurized fuel is introduced into the fuel pressure chamber 114 through the fuel inlet 109 via the fuel passage 115, and pushes the pressure portion 116c of the valve needle 116 to lift the valve needle 116 against the force of the nozzle spring 117, whereby the fuel is sprayed into the combustion chamber through the spray hole 108.

The pressure of the pressurized fuel at the fuel inlet 109 acts on the rear end surface of the plunger member 118 in the cylinder 111 to push the plunger member 118 toward the valve needle 116. The fuel pressure acting on the plunger member 118 controls the lift of the valve needle 116.

Figure 8:
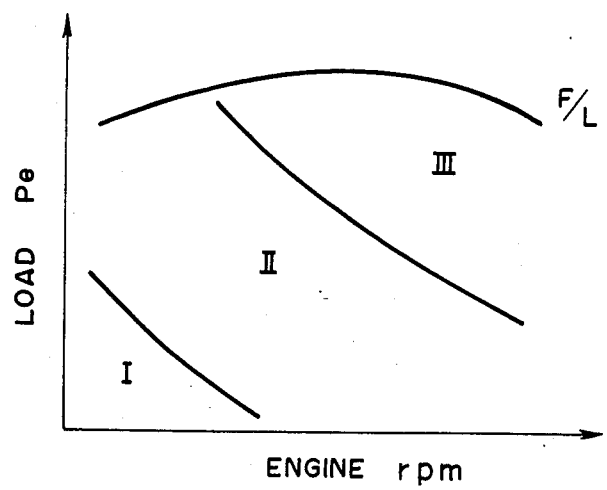
FIG. 8 is a view showing the operating regions of the engine based on which the fuel injection system of the second embodiment is controlled.
Figure 9:
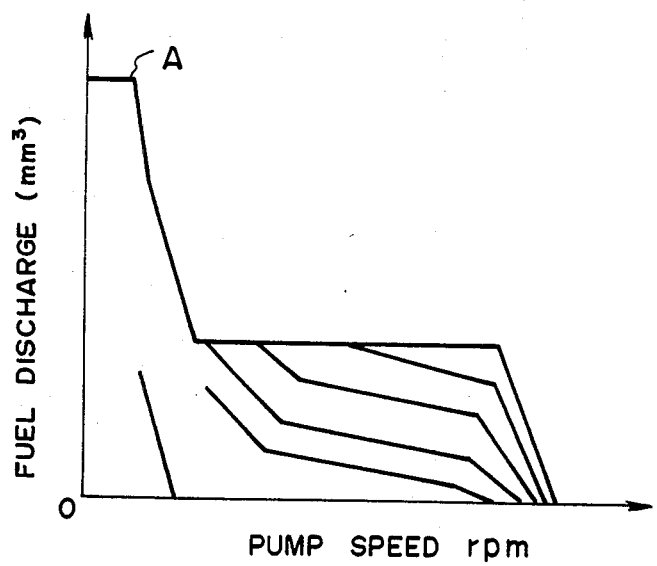
FIG. 9 is a view for illustrating starting supercharging by a fuel injection pump.
Figure 10:
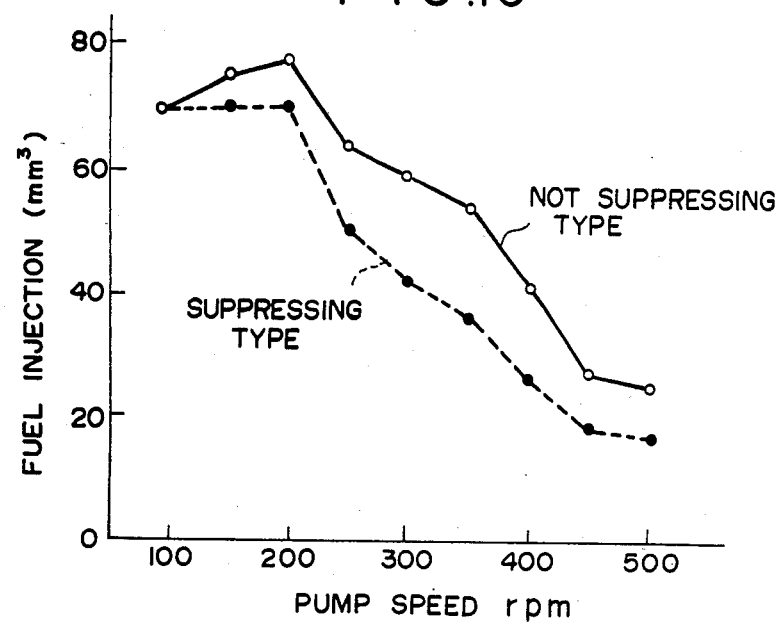
FIG. 10 is a view for illustrating the amount of fuel injected from a needle-lift-suppressing type fuel injection nozzle upon starting compared with that of a nozzle which is not of needle-lift-suppressing type.
Figure 11:
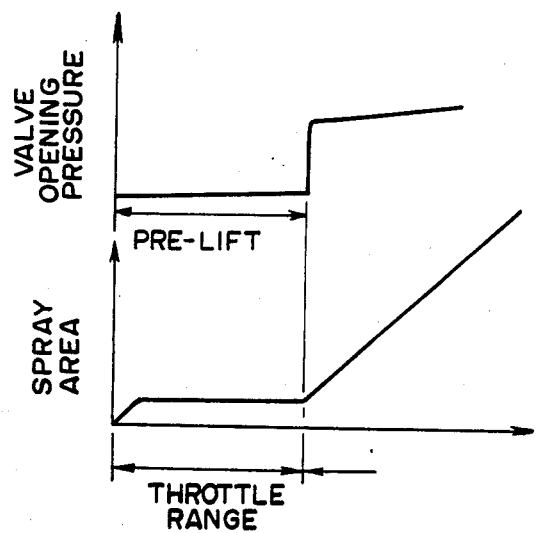
FIG. 11 is view showing the relations between the valve needle lift and the valve opening pressure, and between the valve needle lift and the spray area in the central plunger type pintle fuel injection nozzle.

When it is determined that the operating region is in the low speed, light load region corresponding to zone I in FIG. 8, the solenoid valve 121 is closed and the rotary valve 129 is positioned to communicate the cylinder 111 with the pressure passage 127, and accordingly the valve needle 116 is lifted by the fuel pressure imparted to the pressure portion 116c thereof overcoming only the force of the nozzle spring 117 with leakage fuel in the cylinder 111 being discharged through the first drain passage 119 until the valve needle 116 is lifted to such an extent that the piston portion 116a of the valve needle 116 closes the first drain passage 119, and after the first drain passage 119 is closed, the leakage fuel is confined in the cylinder 111 between the piston portion 116a of the valve needle 116 and the plunger member 118, whereby the fuel pressure acting on the rear end surface of the plunger member 118 is transmitted to the valve needle 116 to resist lift of the valve needle 116, i.e., the opening pressure of the same is increased. This effect is obtained while the lift of the valve needle 116 is in the throttle range since the first drain passage 119 is positioned to be closed by the piston portion 116a of the valve needle 116 when the lift of the same is in the throttle range as described above. By thus limiting lift of the valve needle 116 to within the throttle range, the condition in which fuel is injected from the spray hole 108 at high velocity is maintained for a long time, thereby promoting atomization of the fuel to improve combustion and emission.

When it is determined that the operating condition of the engine is in the intermediate speed intermediate load region corresponding to zone II in FIG. 8 both the solenoid valve 121 and the rotary valve 129 are opened. In this case, the valve needle 116 is lifted discharging the leakage fuel in the cylinder 111 through both the first and second drain passages 119 and 120 until the piston portion 116a thereof closes the first drain passage 119, and thereafter the valve needle 116 is lifted discharging the leakage fuel through only the second drain passage 120. Since the second drain passage 120 is positioned to be closed when the valve needle 116 is lifted to the proportional change range between the throttle range and the maximum lift as described above, the valve opening pressure is increased, by the fuel pressure on the plunger member 118, in the proportional change range whereby sufficient amount of fuel can be sprayed into the combustion chamber and the engine output torque can be improved. When it is determined that the operating condition of the engine is in the high speed, heavy load region corresponding to the zone III in FIG. 8, the solenoid valve 121 is opened and the rotary valve 129 is positioned to communicate the cylinder 111 with the second drain passage 128. In this case, since fuel pressure is not imparted to the plunger member 118, the valve needle 116 is lifted to the maximum without being resisted by the plunger member 118 as in conventional pintle type fuel injection nozzles, whereby sufficient amount of fuel can be sprayed into the combustion chamber and the engine output power can be increased.

Though in the second embodiment, the cylinder 111 is directly communicated with the fuel inlet 109 by way of the pressure passage 127, the pressure line for imparting pressure to the plunger member 118 may be arranged separately from the fuel feeding line as in the first embodiment.

Though in the first and second embodiments, the starting time correction is made only when it is determined that the engine is being cranked at low temperature, it may be made solely depending upon the engine speed, that is, the starting time correction may be made when the engine speed is lower than a predetermined rpm irrespective of the ambient temperature. Further, the starting time correction may be made when the starting supercharging is effected.

When the engine is cold, white smoke is apt to be discharged. Therefore, the pressure to be imparted to the plunger member may be increased in order to improve the combustibility of fuel to reduce emission of white smoke when the operating condition of the engine is determined to be in the condition in which white smoke is apt to be discharged by way of the temperature of the intake air or the temperature of the engine coolant.

In the case of a diesel engine with a supercharger, it is possible to improve distribution of fuel into intake air in the combustion chamber to improve combustion by increasing the pressure to be imparted to the plunger member when the supercharging pressure of intake air is low, and to ensure a sufficient fuel injection amount to increase the engine output power by reducing the pressure to be imparted to the plunger member when the supercharging pressure of intake air is high.

Further, in a diesel engine having an exhaust gas recirculation system, by increasing the pressure to be imparted to the plunger member when the exhaust gas recirculation rate is large, deterioration of emission can be prevented.

By adding to the intake system of the first or second embodiment a swirl control device for controlling the swirling motion of intake air in the combustion chamber and by controlling both the pressure to be imparted to the plunger member and the swirling motion of the intake air according to the operating condition of the engine, the emission level at low load can be improved, emission of smoke at low speed can be reduced, and the engine output power at high speed can be improved.

Though in the above embodiments, the present invention is applied to a direct injection type diesel engine, the present invention can be applied to diesel engines of other types, e.g., to a swirl chamber type diesel engine.

We claim:

1. A fuel injection system for a diesel engine comprising a fuel injection nozzle, a valve needle slidably supported within the fuel injection nozzle and adapted to be lifted under fuel pressure fed from a fuel injection pump to increase the effective spray area with increase in the lift of the valve needle, a needle-lift-suppressing means which limits the lift of the valve needle to a pre-lift of a predetermined amount when the engine operates at low load and/or low speed, a starting detecting means for detecting starting of the engine, and a needle-lift-correcting means which is adapted to receive an output of the starting detecting means and to control the needle-lift-suppressing means so as to permit lift of the valve needle beyond pre-lift irrespective of the engine load and engine speed when the engine is started, wherein said valve needle is urged in a valve closure direction by a resilient member, and said needle-life-suppressing means comprises an urging-force changing means adapted to detect an operating condition of the engine and to increase urging force of the resilient member when the engine operates at low load and/or low speed, actuation of the the urging-force changing means being adapted to be supressed by said needle-lift-correcting means so as to reduce the urging force against the valve needle when the engine is started, and wherein said urging-force changing means is not actuated until the lift of said valve needle reaches a predetermined level.

2. A fuel injection system as defined in claim 1 in which said starting detecting means determines that the engine is being started when the engine does not make complete combustion.

3. A fuel injection system as defined in claim 2 in which said starting detecting means detects whether or not the engine makes complete combustion on the basis of engine rpm.

4. A fuel injection system as defined in claim 3 in which said needle-lift-suppressing means permits lift of the valve needle beyond said pre-lift upon cold starting.

5. A fuel injection system as defined in claim 1 in which said needle-lift-suppressing means permits lift of the valve needle beyond said pre-lift upon cold starting.

6. A fuel injection system as defined in claim 1 in which said fuel injection nozzle is a pintle fuel injection nozzle in which the effective spray area is kept substantially constant until the valve needle is lifted to a predetermined amount, and the effective spray area is gradually increased as the lift of the valve needle increases beyond the predetermined amount.

7. A fuel injection system as defined in claim 6 in which said fuel injection nozzle is provided with a plunger member slidable coaxially with the valve needle and opposed to the valve needle at one end, and said valve-needle-suppressing means controls fluid pressure to be imparted to the other end of the plunger member to control lift of the valve needle.

8. A fuel injection system as defined in claim 7 in which said starting detecting means detects that the engine is being started on the basis of the engine rpm.

9. A fuel injection system as defined in claim 7 in which said needle-lift-suppressing means permits lift of the valve needle beyond said pre-lift upon cold starting.

10. A fuel injection system as defined in claim 6 in which said fuel injection nozzle is provided with a plunger member which is slidable coaxially with the valve needle and has a first end opposed to the valve needle and a second end adapted to be imparted to fuel pressure from the fuel injection pump, and said needle-lift-suppressing means comprises a plurality of drain passages which open between the valve needle and the plunger member at positions spaced from each other by a predetermined distance, and a valve means for selectively opening and closing the drain passages.

11. A fuel injection system as defined in claim 10 in which said needle-lift-suppressing means is further provided with a valve means in the pressure passage for imparting the fuel pressure from the fuel injection pump to the second end of the plunger member and controls lift of the valve needle by selectively opening and closing the valve means in the pressure passage and the drain passages.

12. A fuel injection system as defined in claim 10 in which said starting detecting means detects that the engine is being started on the basis of the engine rpm.

13. A fuel injection system as defined in claim 12 in which said needle-lift-suppressing means permits lift of the valve needle beyond said pre-lift upon cold starting.

14. A fuel injection system as defined in claim 13 in which lift of said valve needle is increased as at least one of the engine load and the engine speed is increased.

15. A fuel injection system as defined in claim 10 in which said needle-lift-suppressing means permits lift of the valve needle beyond said pre-lift upon cold starting.

16. A fuel injection system as defined in claim 6 in which said needle-lift-suppressing means permits lift of the valve needle beyond said pre-lift upon cold starting.

17. A fuel injection system as defined in claim 6 in which said starting detecting means detects that the engine is being started on the basis of the engine rpm.

18. A fuel injection system as defined in claim 1 in which lift of said valve needle is increased as at least one of the engine load and the engine speed is increased.

* * * * *